US012081940B2

(12) United States Patent
Albahri et al.

(10) Patent No.: US 12,081,940 B2
(45) Date of Patent: *Sep. 3, 2024

(54) ACOUSTIC RECEIVER AND METHOD OF MAKING SAME

(71) Applicant: KNOWLES ELECTRONICS, LLC, Itasca, IL (US)

(72) Inventors: Shehab Albahri, Hanover Park, IL (US); Paul Dayton, Wayne, IL (US); Thomas Miller, Arlington Heights, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,437

(22) Filed: Dec. 28, 2022

(65) Prior Publication Data

US 2023/0164493 A1 May 25, 2023

Related U.S. Application Data

(63) Continuation of application No. 16/630,874, filed as application No. PCT/US2018/041921 on Jul. 13, 2018, now Pat. No. 11,582,558.

(60) Provisional application No. 62/532,887, filed on Jul. 14, 2017.

(51) Int. Cl.

| | |
|---|---|
| ***H04R 11/02*** | (2006.01) |
| ***H04R 7/12*** | (2006.01) |
| ***H04R 7/18*** | (2006.01) |
| ***H04R 31/00*** | (2006.01) |

(52) U.S. Cl.

CPC ............... *H04R 11/02* (2013.01); *H04R 7/12* (2013.01); *H04R 7/18* (2013.01); *H04R 31/006* (2013.01)

(58) Field of Classification Search

CPC . H04R 11/02; H04R 7/12; H04R 7/18; H04R 31/006

See application file for complete search history.

(56) References Cited

U.S. PATENT DOCUMENTS

| | | | |
|---|---|---|---|
| 3,249,702 | A | 5/1966 | Carlson |
| 3,935,398 | A | 1/1976 | Carlson et al. |
| 5,690,093 | A | 11/1997 | Schrank et al. |
| 6,757,403 | B2 | 6/2004 | Urushibata et al. |
| 8,461,728 | B2 | 6/2013 | Park et al. |
| 8,948,435 | B2 | 2/2015 | Dosato et al. |
| 10,917,731 | B2 | 2/2021 | Monti |

(Continued)

FOREIGN PATENT DOCUMENTS

| | | | |
|---|---|---|---|
| CN | 204350285 | U | 5/2015 |
| CN | 205596313 | U | 9/2016 |
| CN | 107135449 | A | 9/2017 |
| CN | 107222818 | A | 9/2017 |

(Continued)

OTHER PUBLICATIONS

International Search Report and Written Opinion, PCT/ US2017/ 056873, Mar. 19, 2018, 29 pages.

(Continued)

*Primary Examiner* — Suhan Ni

(57) ABSTRACT

An acoustic receiver includes a first receiver subassembly having bottom housing plate with at least a portion of a motor fastened thereto, and a second receiver subassembly having a closed-ended housing wall with at least one open end that is fastened to the bottom housing plate. A method of making and assembling the components is also described.

8 Claims, 6 Drawing Sheets

(56) References Cited

U.S. PATENT DOCUMENTS

| | | | |
|---|---|---|---|
| 11,012,786 | B2 | 5/2021 | King et al. |
| 11,076,247 | B2 | 7/2021 | Albahri |
| 11,159,890 | B2 | 10/2021 | Zhang et al. |
| 2006/0140436 | A1 | 6/2006 | Moel et al. |
| 2006/0239488 | A1 | 10/2006 | Geschiere et al. |
| 2010/0054509 | A1 | 3/2010 | Thompson |
| 2010/0067730 | A1 | 3/2010 | Halteren et al. |
| 2012/0008814 | A1 | 1/2012 | Alwicker et al. |
| 2012/0286865 | A1 | 11/2012 | Chandrasekaran |
| 2013/0058508 | A1 | 3/2013 | Oosato et al. |
| 2013/0272564 | A1 | 10/2013 | Miller |
| 2014/0369548 | A1 | 12/2014 | Manley et al. |
| 2015/0036831 | A1 | 2/2015 | Klippel |
| 2015/0249889 | A1 | 9/2015 | Iyer et al. |
| 2016/0227328 | A1 | 8/2016 | Halteren et al. |
| 2019/0238994 | A1 | 8/2019 | King et al. |
| 2020/0154212 | A1 | 5/2020 | Albahri et al. |
| 2020/0213786 | A1 | 7/2020 | Monti |
| 2020/0213788 | A1 | 7/2020 | Albahri |
| 2021/0120341 | A1 | 4/2021 | Zhang et al. |

FOREIGN PATENT DOCUMENTS

| | | | |
|---|---|---|---|
| CN | 206775740 | U | 12/2017 |
| CN | 107547989 | A | 1/2018 |
| CN | 206879090 | U | 1/2018 |
| CN | 207354540 | U | 5/2018 |
| CN | 210868157 | U | 6/2020 |
| CN | 211089971 | U | 7/2020 |
| CN | 108989956 | B | 9/2020 |
| CN | 212163701 | U | 12/2020 |
| CN | 112689218 | A | 4/2021 |
| CN | 213485111 | U | 6/2021 |
| DE | 202020105931 | U1 | 10/2020 |
| DE | 102020126778 | A1 | 4/2021 |
| GB | 859830 | A | 1/1961 |
| PH | 22020000001 | Y1 | 8/2020 |
| PH | 12020050402 | A1 | 4/2021 |
| WO | 2015057519 | A1 | 4/2015 |
| WO | 2016058637 | A1 | 4/2016 |
| WO | 2019014510 | A2 | 1/2019 |

OTHER PUBLICATIONS

International Search Report and Written Opinion, PCT/ US2018/ 041921, Feb. 15, 2019, 22 pages.

ACOUSTIC RECEIVER AND METHOD OF MAKING SAME

RELATED APPLICATIONS

This application is a continuing application of co-pending U.S. patent application Ser. No. 16/630,874 filed on Jan. 14, 2020, and entitled "ACOUSTIC RECEIVER AND METHOD OF MAKING SAME," owned by instant assignee and claims priority thereto, which claims priority to 371 International Patent Application Serial No. PCT/US2018/041921 filed Jul. 13, 2018, and entitled "ACOUSTIC RECEIVER AND METHOD OF MAKING SAME," which further claims priority to U.S. Provisional Patent Application Ser. No. 62/532,887 filed on Jul. 14, 2017, and entitled "ACOUSTIC RECEIVER AND METHOD OF MAKING SAME," the entire contents of which are hereby incorporated by reference.

TECHNICAL FIELD

The disclosure relates to acoustic receivers such as, but not limited, to balanced armature receivers, and methods therefor.

BACKGROUND

Acoustic receivers are used in hearing instruments such as hearing aids, headphones, and earbuds among other devices. Acoustic receivers typically include a motor having a coil, a yoke that retains magnets, and a reed (or armature) having a portion that extends through the coil and between the magnets. An electrical signal applied to the coil creates a magnetic field within the motor causing the reed to move between the magnets. Movement of the reed in turn causes movement of a diaphragm within a receiver housing, from which sound is emitted from an acoustic port.

Known acoustic receiver assemblies employ a multi-sided cup into which the motor and diaphragm are placed during manufacture before an open end of the cup is covered with a plate. The cup is an unassembled unitary member typically formed in a deep drawing process. However, manufacturing operations to assemble the receiver are slow and costly due to the laborious manual assembly of the various components. Operators typically have to spend a lot of time loading and unloading the acoustic receiver into different fixtures during the assembly process.

Accordingly, a need exists for an improved acoustic receiver and manufacturing methods.

Figure 1:
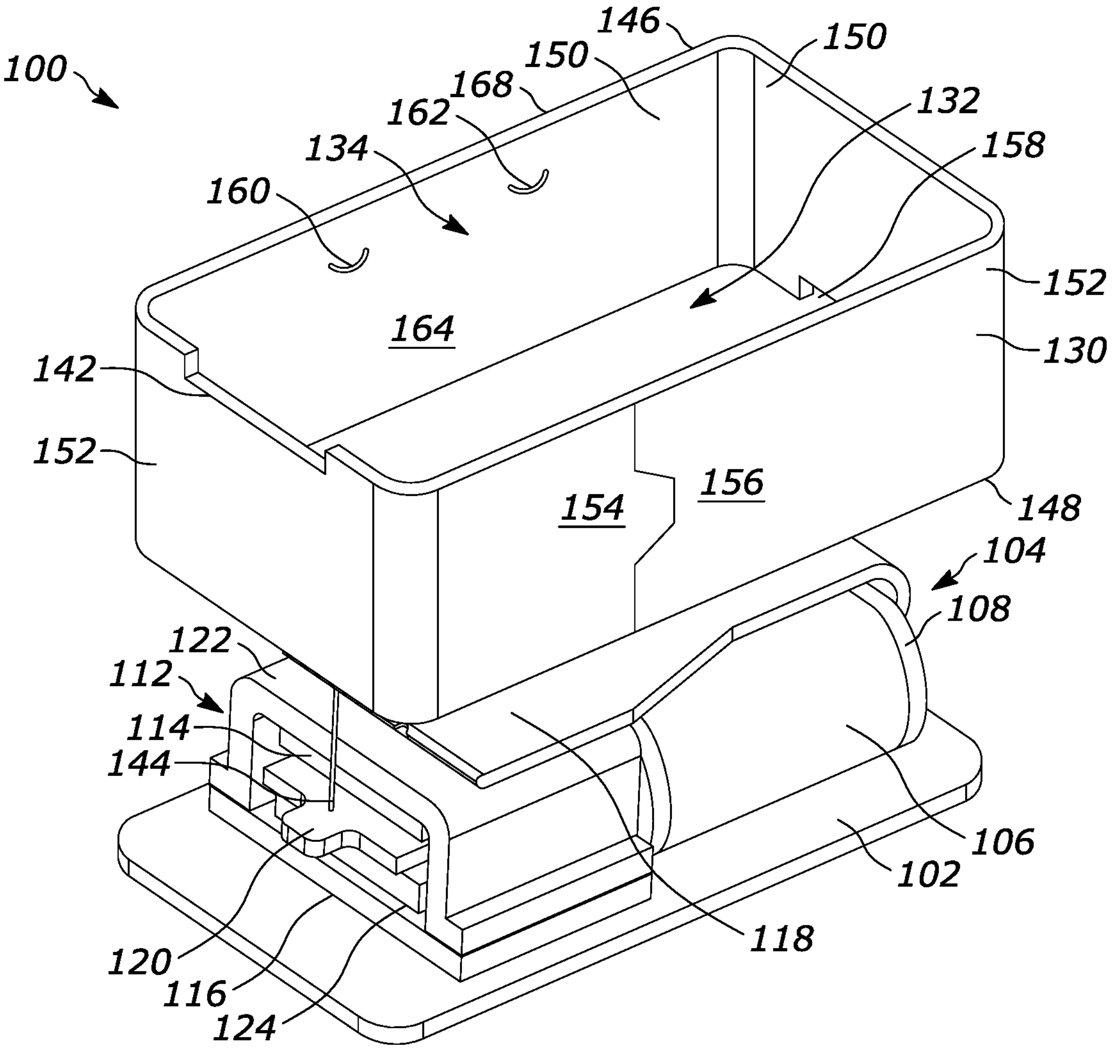
FIG. 1 illustrates a partial assembly view of an acoustic receiver in accordance with one example set forth in the disclosure.

Those of ordinary skill in the art will appreciate that elements in the figures are illustrated for simplicity and clarity. It will be further appreciated that certain actions or steps may be described or depicted in a particular order of occurrence while those of ordinary skill in the art will understand that such specificity with respect to sequence is not actually required unless a particular order is specifically indicated. It will also be understood that the terms and expressions used herein have the ordinary meaning as is accorded to such terms and expressions with respect to their corresponding respective fields of inquiry and study except where specific meanings have otherwise been set forth herein.

DETAILED DESCRIPTION

The disclosure is drawn generally to acoustic receivers comprising separate receiver subassemblies. In one embodiment, a first receiver subassembly comprises a motor disposed on a bottom housing plate, wherein the motor includes a coil having a passage, a yoke retaining first and second magnets, and a reed having a portion extending through the passage and between the magnets. A second receiver subassembly comprises a closed-ended housing sidewall having a first open end, wherein the bottom housing plate is disposed over and fastened to the first open end of the closed-ended housing sidewall to form at least a portion of a receiver housing such that the closed-ended housing sidewall is disposed about the motor. A diaphragm located in the housing separates the housing into a front volume and a back volume, wherein the motor is disposed in the back volume. The reed is linked to the diaphragm and is movable between the first and second magnets in response to an excitation signal applied to the coil.

The closed-ended housing sidewall includes an acoustical port through a portion of the sidewall forming the front volume and a lead pass-through opening through a portion of the sidewall forming the back volume. In one embodiment, the closed-ended housing sidewall is a folded sheet material having a first end and a second end coupled at a butt joint, wherein the folded sheet material has multiple sidewall portions and wherein the acoustical port is disposed through the first sidewall portion and the lead pass-through opening is disposed through the second sidewall portion opposite the first sidewall portion. In one implementation, an inside surface of the closed-ended housing sidewall includes projections on which the diaphragm is disposed.

According to another aspect, an acoustic receiver subassembly comprises a yoke fastened to a housing cover plate, wherein the yoke retaining first and second magnets in spaced apart relation, an electrical coil fastened to the housing cover plate, and a reed having a portion extending through the coil and between the first and second magnets, wherein the acoustic receiver subassembly may be assembled with a separate subassembly to form at least a portion of a receiver housing. The yoke may be fastened to the housing cover plate with a weld or other mechanism, and the coil may be disposed about a bobbin, wherein the coil is fastened to the housing cover plate with adhesive.

The receiver subassembly may be combined with a separate subassembly comprising a closed-ended housing sidewall having a first open end, wherein the housing cover plate is fastened to the first open end of the closed-ended housing sidewall so that the closed-ended housing sidewall is circumferentially disposed about the yoke and the coil. The closed-ended housing sidewall generally includes a coil lead opening and an acoustic port. In one embodiment, the closed-ended housing sidewall is a folded sheet material with end portions fastened at a joint, for example a butt joint or press fit joint or some other joint. Alternatively, the closed-ended sidewall may be a molded or extruded or drawn element.

A diaphragm is located in the closed-ended housing sidewall either before or after the subassembly with the housing cover plate. The diaphragm may be located by protrusions on an inner side of the closed-ended housing sidewall.

In one embodiment, the closed-ended housing sidewall has a second open end opposite the first open end, and a second housing cover plate is fastened to the second open end of the closed-ended housing sidewall after the diaphragm is located in the receiver housing. In this embodiment, the diaphragm separates an interior of the receiver housing formed by the housing cover plate, the second housing cover plate and the closed-ended housing sidewall into a front volume and a back volume, wherein the coil and yoke are disposed in the back volume.

In another embodiment, the closed-ended housing sidewall is a single-piece five sided cup. In this embodiment, the diaphragm is located in the cup before the housing cover plate is fastened to the closed-ended housing side wall, wherein the diaphragm separates an interior of the receiver housing formed by the five-sided cup and the housing cover plate into a front volume and a back volume.

According to another aspect, an acoustic receiver housing sidewall subassembly comprises a single strip of metal including first and second ends coupled by a joint to form a closed-ended receiver housing sidewall, an acoustical port disposed through a first portion of the closed-ended receiver housing sidewall, a lead pass-through opening disposed through a second portion of the closed-ended receiver housing sidewall, and a plurality of diaphragm-support projections protruding from an inside surface of the closed-ended receiver housing sidewall, wherein the acoustical port is disposed on one side of the diaphragm-support projections and the lead pass-through opening is disposed on an opposite side of the diaphragm-support projections.

The closed-ended receiver housing sidewall joint may be a butt joint, or a press fit joint comprising a tab on the first end and a complementary recess on the second end, wherein the tab is disposed (e.g., press fit) in the complementary recess. The joint may also be a combination of these or other types of joints.

According to one approach, a receiver subassembly may be made by fastening a yoke with spaced apart magnets to a first housing cover, fastening an electrical coil to a common side of the first housing cover, and disposing a reed through a passage of the coil so that a movable portion of the reed is disposed between the first and second magnets of the yoke, and then assembling the first receiver subassembly with a second receiver subassembly.

The second receiver subassembly may be a closed-ended receiver housing sidewall having an open end, wherein at least a portion of a receiver housing is formed by fastening the first housing cover to the open end of the closed-ended receiver housing sidewall so that the closed-ended receiver housing sidewall is circumferentially disposed about the yoke and the electrical coil.

As suggested, a diaphragm is located in the closed-ended receiver housing sidewall and a movable portion of the reed is coupled to a movable portion of the diaphragm, for example by a drive rod or other linking element.

In processes where the diaphragm is located in the closed-ended receiver housing sidewall before assembling the first receiver subassembly with the second receiver subassembly, the diaphragm is part of the second receiver subassembly. In other processes, the closed-ended sidewall includes a second open end and the diaphragm is located in the closed-ended receiver housing sidewall after assembling the first receiver subassembly with the second receiver subassembly. Thereafter, a second housing cover is fastened to the second open end of the closed-ended receiver housing sidewall, wherein the first housing cover, the second housing cover and the closed-ended receiver housing sidewall form the receiver housing.

Figure 2:
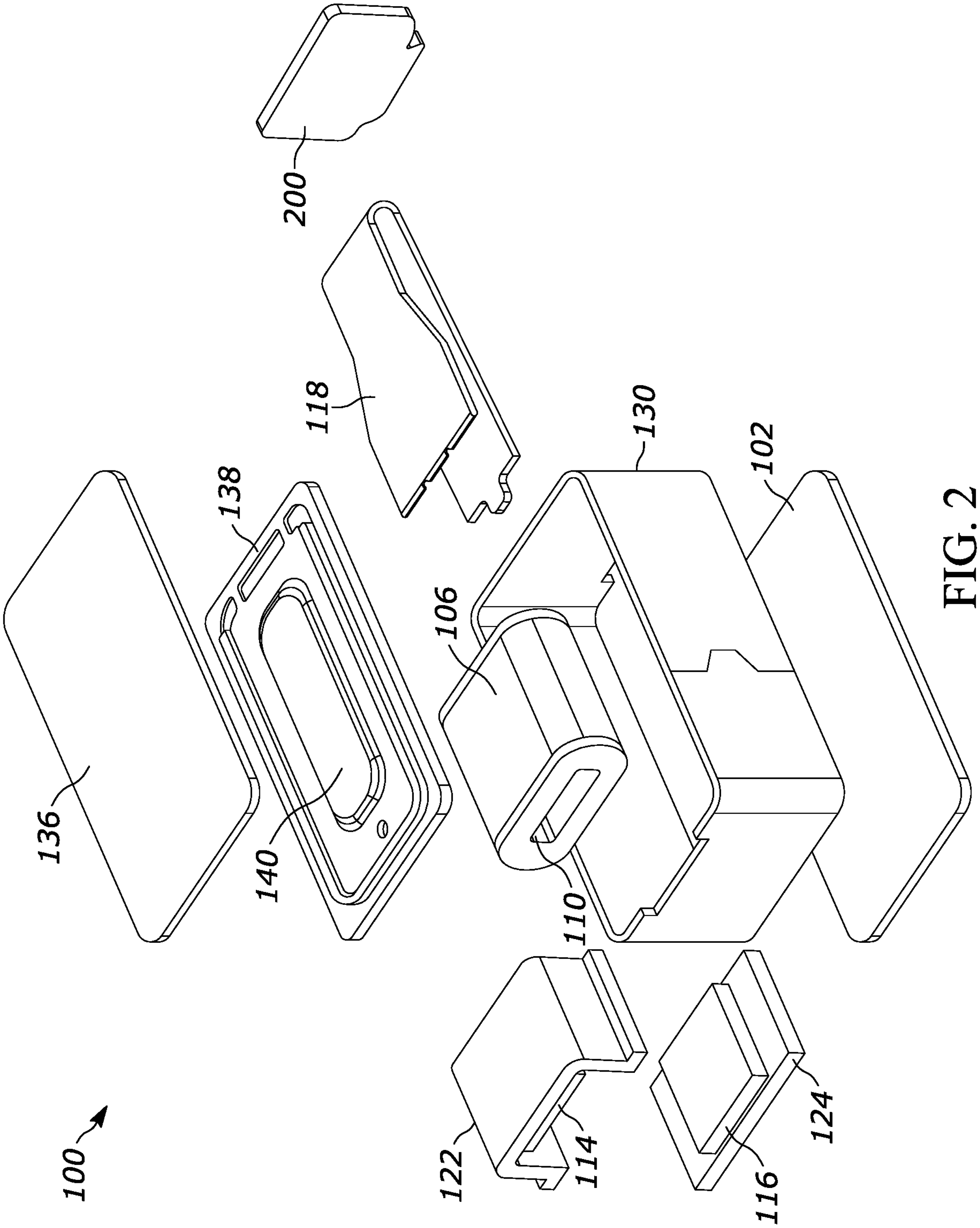
FIG. 2 is an exploded view of an acoustic receiver in accordance with one example set forth in the disclosure.

FIG. 1 illustrates one example of an acoustic receiver 100 without a diaphragm and top cover plate. The acoustic receiver 100 may be a single armature receiver, a multiple armature receiver or any other suitable acoustic receiver. In this example, the acoustic receiver 100 includes a bottom housing plate 102, a motor 104 disposed on the bottom housing plate 102. The motor 104 includes a coil 106. Referring also to FIG. 2, the coil 106 in this example is wound around a coil bobbin 108. However, in other embodiments, the coil does not include the bobbin. In FIG. 2, the coil includes a coil passage 110 and the yoke retains a first magnet 114 and a second magnet 116 in spaced apart relation. A reed (or armature) 118 has a portion 120 extending through the coil 106 and between the magnets 114 and 116.

In this example, the yoke is an assembly including a strap portion 122 retaining magnet 114 and a magnetic plate 124 retaining the magnet 116. In FIGS. 1 and 2, the magnet plate 124 is fastened to the housing cover 102 by a weld, or adhesive, or crimped flanges or by some other fastening mechanism. In some embodiments, the magnet plate 124 may also be located by protrusions formed or disposed on the bottom plate 102. The strap portion 122 may be welded to the magnet plate 124 before or after the magnet 114 is fastened thereto. In other embodiments, the yoke is a stamped or laser cut and folded structure with butt joined ends, or a stacked closed-ended plates welded together, or a section of extruded tube stock, or any other suitable structure. The first and second magnets may be fastened to the yoke by a weld, adhesive or crimped flange or by some other fastening mechanism. In FIGS. 1-2, the reed 118 is a U reed with an end portion fastened to the yoke. In other embodiments, however, the reed may be configured differently, for example it may be coupled to a portion of the housing. The motor and the bottom cover plate or housing cover form a first receiver subassembly.

In FIGS. 1-2, a closed-ended housing wall or sidewall 130 is disposed about the motor 104 after the motor is disposed on the bottom plate 102. The housing wall 130 includes at least a first open end 132 and in some embodiments a second open end 134. The closed-ended housing sidewall forms a second receiver subassembly. The first and second subassemblies are assembled by fastening the housing cover or plate 102 with the motor to the first open end 132 of the closed-ended housing sidewall. In FIGS. 1-2, the closed-ended housing sidewall also has a second open end 134 coupled to a top housing plate 136. The closed-ended housing wall 130, the bottom housing plate 102 and the top housing plate 136 are discrete elements that when assembled, form a receiver housing. In other embodiments however, the closed-ended housing sidewall may be embodied as five-sided cup with only a single open end to which the housing cover is fastened. Such cups may be formed in a drawing process. Thus assembled, the closed-ended housing sidewall and housing cover form at least a portion of a receiver housing, wherein the sidewall is circumferentially disposed about the motor.

In FIG. 2, a diaphragm 138 is disposed and retained in the receiver housing when assembled. The diaphragm 138 separates an interior of the receiver housing into a front volume and a back volume. The motor 104 is disposed in the back volume. The diaphragm 138 includes a paddle 140 which when moved causes sound to emanate from an acoustical notch opening or port 142 located in the closed-ended housing wall 130. In some embodiments, the receiver housing is formed by fastening the top housing plate 136 to the second open end portion 134 of the closed-ended housing wall 130. The one or more housing covers can be fastened to the closed-ended housing sidewall by a weld, or adhesive, or crimped flanges, or by some other fastening mechanism. Depending on the configuration of the closed-ended housing sidewall, the diaphragm may be assembled with the closed-ended housing side wall before or after the closed-ended housing sidewall is assembled with the first receiver subassembly. If the closed-ended housing sidewall is a cup having only one open end, the diaphragm must be disposed and retained in the cup before the cup is assembled with the first receiver subassembly.

In FIG. 1, a link 144, also referred to as a drive rod, interconnects a moveable portion 120 of the reed with a moveable portion of the diaphragm 138, in this case the paddle 140 shown in FIG. 2. The reed is moveable between the first and second magnets 114 and 116 in response to an excitation signal applied to the coil 106. FIG. 2 also illustrates a termination cover 200 which may include one or more a connectors or contacts coupled to the electrical leads of the coil. The termination cover is disposed on an outer side of the receiver housing where the coil and any other electrical leads emanate from the interior of the housing. The termination cover may be fastened to the housing with adhesive and any openings around the electrical leads may be sealed with adhesive or other material.

In FIGS. 1-2, the closed-ended housing wall 130 in this example is shown to be a folded sheet material, such as a strip of folded metal, having a first edge 146 and a second edge 148 an inside surface 150, an outside surface 152, a first end 154 and a second end 156. The first edge 146 includes an acoustical notch opening or port 142 located in the front volume whereas the second edge 148 includes a lead pass-through opening or port 158 located in the back volume. In other embodiments, these ports may be located inwardly of the sidewall edge. The lead pass-through opening allows the passage of electrical leads for the coil and any other electronic components through the housing sidewall for termination at cover 200.

The inside surface 150 includes projections also referred to semi-perforations 160, 162 as well as corresponding projections on the opposing sidewall (not shown). The projections 160 and 162 locate the diaphragm 138. In some embodiments, the diaphragm is positioned on the perforations and fastened with an adhesive. Alternatively, the diaphragm may be located and retained between an array of oppositely positioned perforations. In some embodiments, closed-ended housing sidewall 130 includes four sidewalls such that the acoustical notch opening 142 is in a sidewall that is opposed to the sidewall that includes the lead pass through opening 158. However it will be recognized that any suitable location of the lead pass through opening and acoustic notch opening may be employed. Opposing sidewalls 164 and 168 each include the projections that are adapted to locate the diaphragm 138. In this example, sidewall 164 is formed also by butt joining of the first end 154 and second end 156. However, the joint may be placed at any suitable sidewall.

In this example, the first end and second end 154 and 156 are pressed together so that the first and second connecting portions engage with each other. However, it will be recognized that any suitable securing mechanism may be employed including braising, blooming, or any other suitable mechanism for providing the first end and second end to be suitably connected with each other.

Unlike prior designs, the acoustic receiver employs a separate bottom housing plate with a motor or portion of a motor, wherein the subassembly may be assembled with another subassembly like a closed-ended housing sidewall that has at least one open end.

Figure 3:
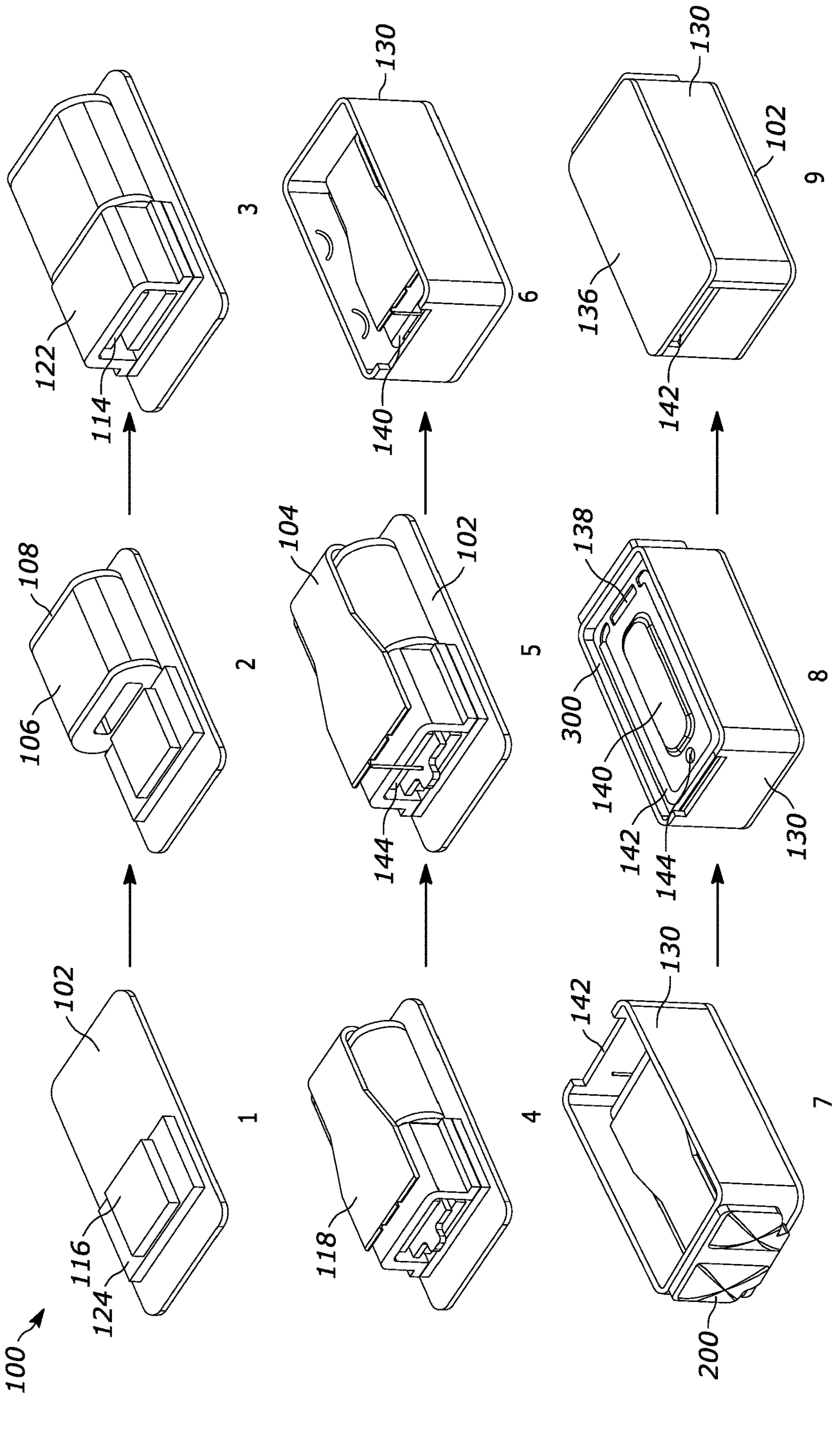
FIG. 3 is a diagram illustrating one example of an assembly sequence to assemble the acoustic receiver shown in FIG. 2.
Figure 4:
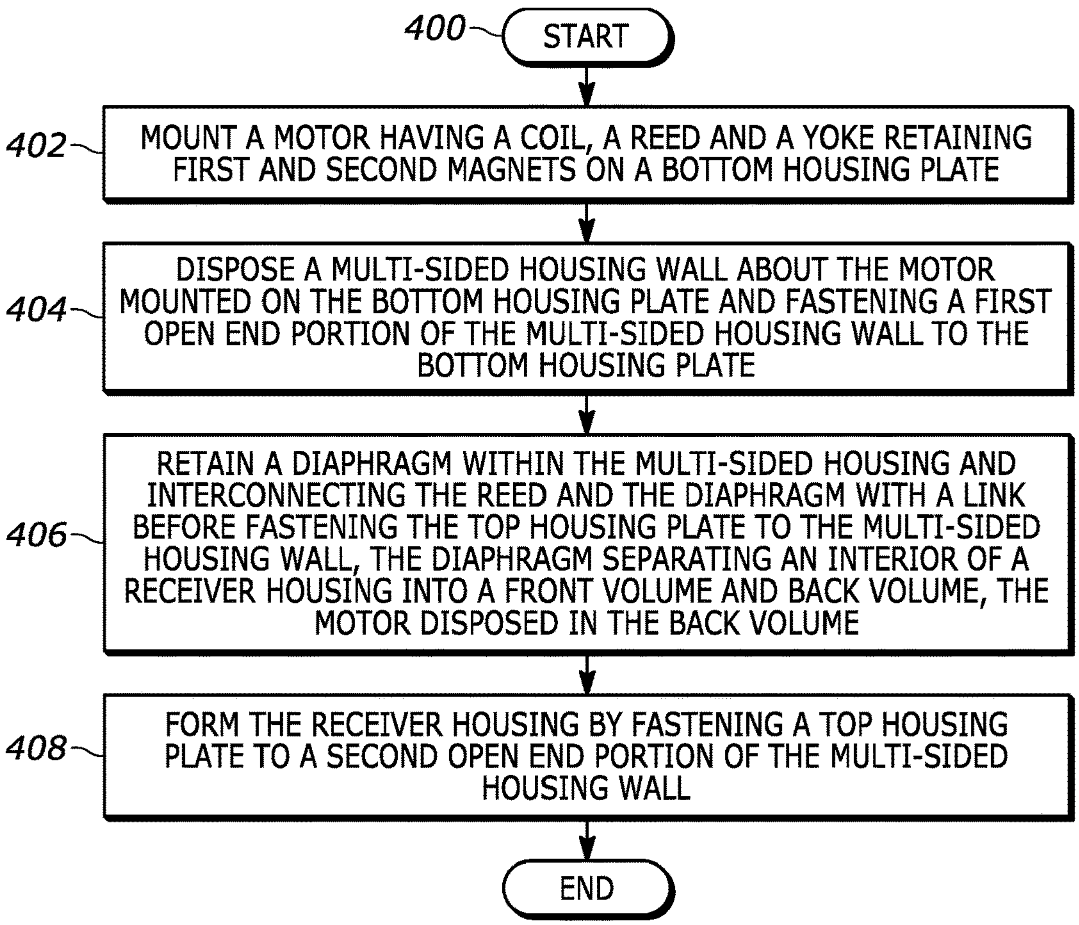
FIG. 4 is a flowchart illustrating a method for manufacturing an acoustic receiver in accordance with one example set forth in the disclosure.

Referring to FIGS. 3 and 4, an example of an assembly method will be described to make an acoustic receiver 100. In this example, nine steps are shown in FIG. 3, however any suitable number may be employed. The front volume 300 is shown in step 8. The operations described herein may be carried out manually or using automated assembly machines and fixtures. As shown in FIG. 4, assembly of the acoustic receiver is shown starting in block 400. In block 402, the motor 104 having a coil, a reed, and a yoke retaining first and second magnets is mounted on the bottom housing plate 102 to form a first receiver subassembly. This is shown for example, in step 5. For example, the motor assembly may be at least partially preassembled and then placed on the bottom housing plate.

Referring back to FIG. 3, a first operation 1 may include placing the magnetic plate 124 on a top surface of the bottom housing plate 102. This may be done at a spot welding operation or any other suitable attachment operation. The magnet 116 is affixed on a magnetic plate. It will also be recognized that the operations described herein may combined or reordered as desired and may include preassembly operations or other operations as desired. For example, the magnets may be fastened to the yoke before or after the yoke is fastened to the housing cover, depending on the type or configuration of the yoke, various examples of which were discussed above. As shown in operation 2, the coil 106 and bobbin 108 are secured to the bottom housing plate 102 via a suitable adhesive. The coil may be located by the yoke of by other structure on the housing cover. In operation 3 the yolk strap 122 with the magnet 114 is placed on the magnetic plate and secured by a weld or retaining structure. The reed 118 is positioned through the coil passage and between the magnets 114 and 116 as shown and fastened in operation 4. Whether the reed is fastened to the yoke or other structure depends on the configuration of the reed. As shown in operation 5, link 144 (drive rod) that interconnects a moveable portion of the reed 118 with a moveable portion of the diaphragm 138 is placed in the reed. Mounting all or some portions of the motor on the bottom housing plate 102 before assembly of the closed-ended housing wall 130 provides ready access to the motor or portions thereof during the subassembly process as discussed further below.

Referring also to FIG. 4, as shown in block 404 and as illustrated in operation 6 of FIG. 3, the closed-ended housing wall 130 subassembly is disposed about the motor 104 mounted on the bottom housing plate 102 subassembly and the edge 148 of the closed-ended housing wall 130 is fastened to the bottom housing plate 102. This is secured using a weld, or crimped flange, or adhesive or other suitable means. In this example, the closed-ended housing wall 130 is formed (folded) from a strip of stamped or laser cut metal (as further described below) and the base plate is made of steel. However, any suitable materials may be employed. For example, the closed-ended housing wall may be formed of metal in a drawing process. Alternatively, the closed-ended housing wall may be made from plastic, carbon fiber, metal, or any other suitable material in a folding, drawing, extruding, molding or other suitable process.

Referring back to FIG. 3, as shown in operation 7, the terminal cover 200 is affixed to the exterior sidewall of the receiver housing that includes the lead pass through opening 158. The cover may be retained with adhesive or some other retaining mechanism and any the lead opening may be sealed with adhesive or other suitable material. The terminal cover includes an electrical interface, e.g., contacts, electrically coupled to the leads of the coil and other electrical components within the receiver housing. Referring to block 406 and operation 8, the diaphragm 138 is located within the closed-ended housing wall 130 by the protrusions 160, 162, 608 and 610 (see FIG. 6) as discussed herein. The link 144 interconnects with the reed and the diaphragm. For example, the link 144 is attached to the reed 118 and passed through an opening within the diaphragm 138 and secured thereto using conventional techniques known in the art. The diaphragm 138 separates an interior of the receiver housing into a front volume and a back volume as noted. The motor 104 is disposed in the back volume of the receiver housing. Referring to operation 9 and as shown in block 408, the receiver housing is closed by fastening the top housing plate 136 to the second open end 134 of the closed-ended housing wall 130.

Figure 5:
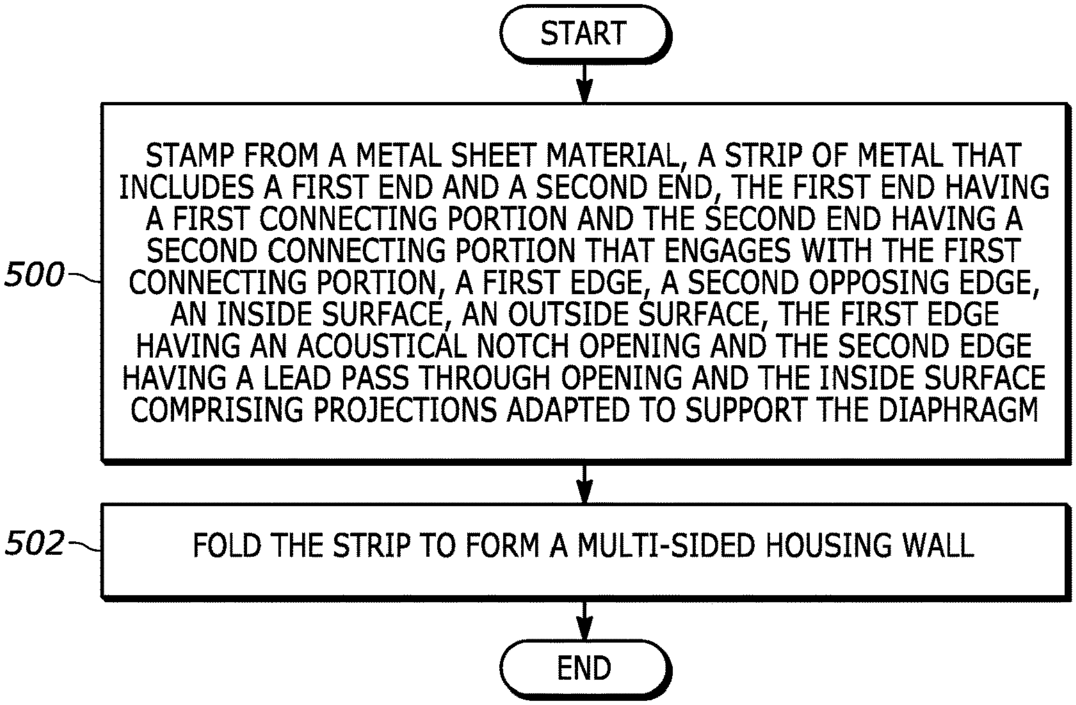
FIG. 5 is a flowchart illustrating a method of making an acoustic receiver component in accordance with one example set forth in the disclosure.
Figure 6:
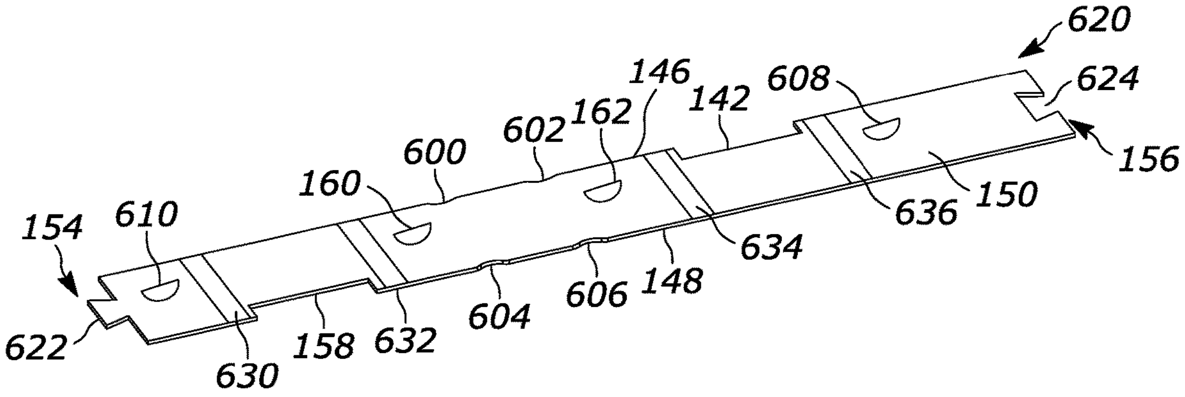
FIGS. 6-10 illustrate a strip of sheet material folded to form a closed-ended housing wall in accordance with one example set forth in the disclosure.

FIG. 5 illustrates a process flow for making an acoustic receiver component, namely the closed-ended housing wall subassembly. In this example, as shown in FIG. 6, a stamping machine stamps from a metal sheet material, a strip of metal 620 that includes the first end 154 and second end 156. Alternatively the strip may be cut with a laser or other cutting tool. The first end having a first connecting portion 622, in this example shown as a protruding tab. The strip is stamped to include the second end 156 that includes a second connecting portion 624 shown to be a notch adapted to frictionally engage the protruding portion 622 in a pressed fit manner. As such, the first and second connecting portions are configured to engage with each other to form a pressed fit connection. In another example, the ends may be flat if desired and suitably braised, glued or otherwise attached at a butt joint, alone or in combination with the press fit described above. Any other suitable interconnecting mechanism may also be employed. The strip of metal 620 includes the first edge 146, the second opposing edge 148, the inside surface 150 and the outside surface 152. As shown and previously described with respect to FIGS. 1 and 2, the first edge 146 includes the acoustical notch opening 142. The inside surfaces include the stamped projections or semi-perforations 160, 162, 608 and 610 adapted to locate the diaphragm 138. A corresponding indentation 800 (see FIG. 8) on the outside surface 152 for projection 608 (see FIG. 6) is shown for illustration purposes. However it will be recognized that the protrusions need not be stamped and may be added to the inner surface. This may be done in any suitable manner such as by adding epoxy material, metal or other material. Scored folding lines 630, 632, 634 and 636 are used to ease and guide the corner folding operation to form the various sidewall portions as shown. As shown in block 502 of FIG. 5, the method includes folding the metal strip, as also shown in FIGS. 7-10 to from the closed-ended housing sidewall.

Referring to FIGS. 6-10, an example of a closed-ended housing wall is shown in various stages being formed by folding a single sheet material. In other embodiments, the closed-ended housing wall may be formed from two or more sheets fastened end-to-end by butt joints or press fit tabs and notches. Projections 608 and 610 are shown which are positioned such that when the closed-ended housing wall 130 is completely folded, they are of the same height from the top edge 146 and serve to locate the diaphragm 138.

Figure 7:
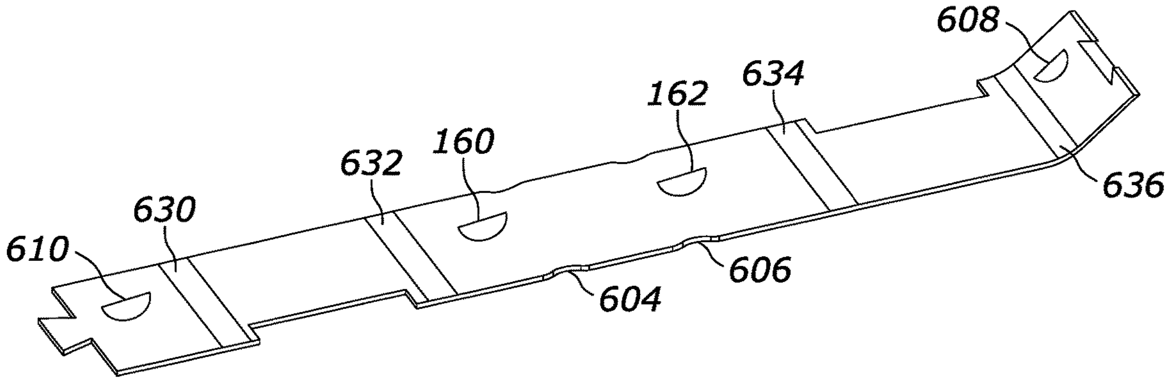
Figure 8:
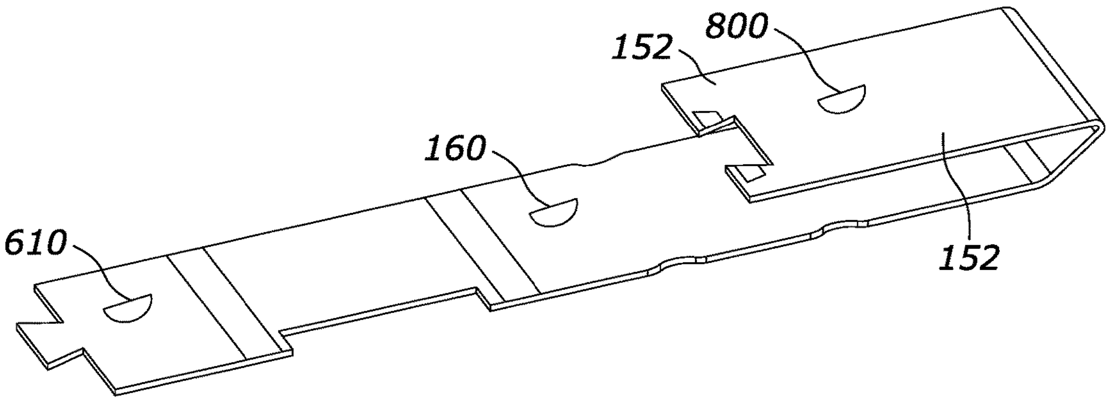
Figure 9:
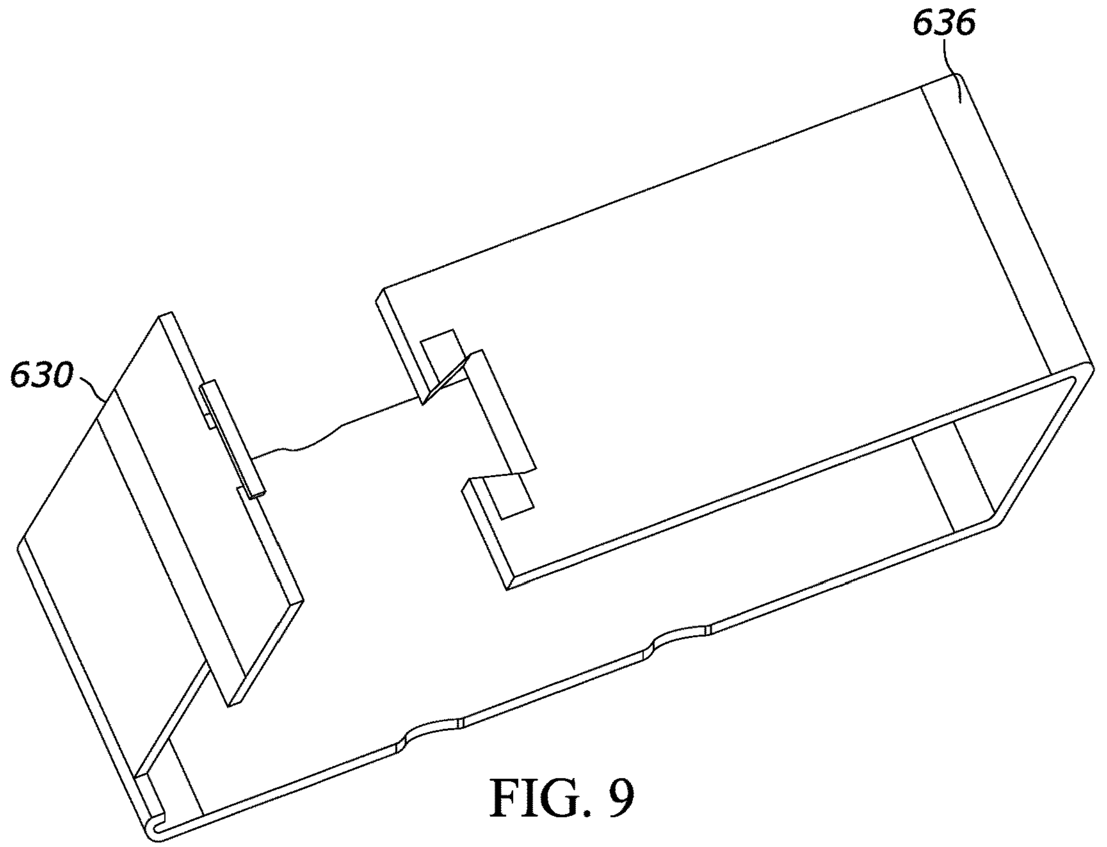
Figure 10:
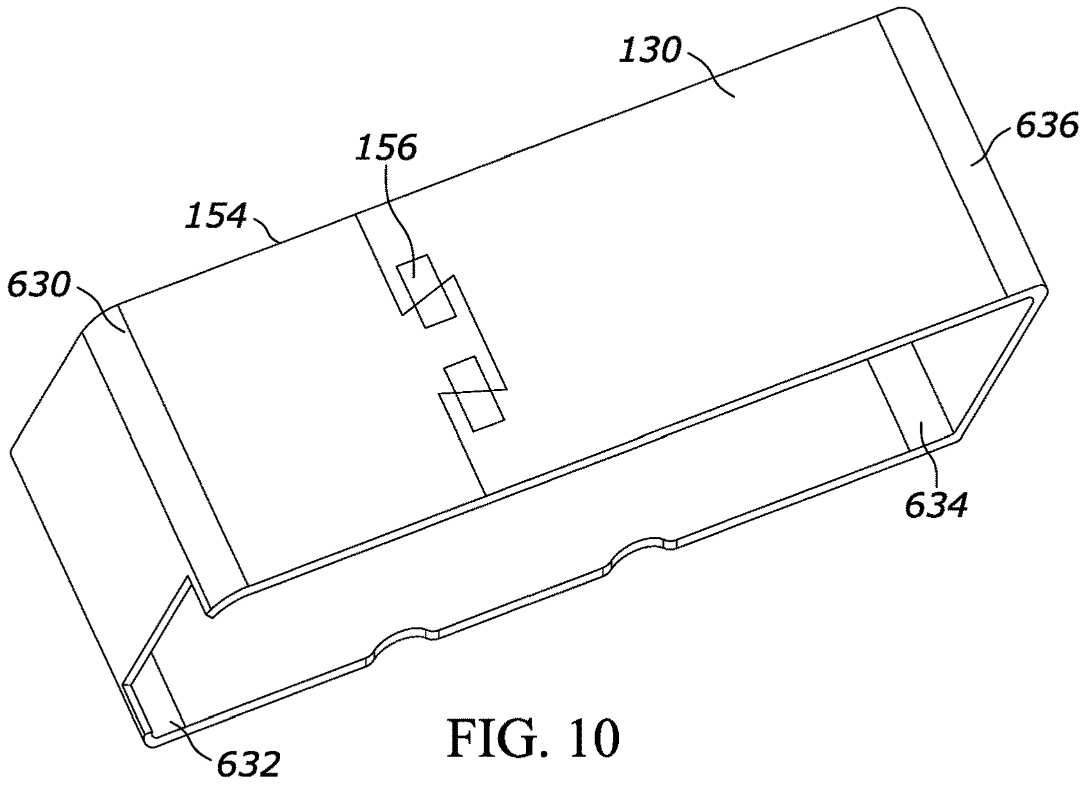

FIG. 7 shows a first fold along fold score line 636, FIG. 8 shows a second fold along fold score line 634 (shown in FIG. 7), FIG. 9 illustrates a fold line along 632 (shown in FIG. 7) and FIG. 10 illustrates a closed-ended housing wall 130 formed by connecting the first end and second end 154 and 156. For clarity, FIG. 9 does not illustrate the indent 800 on the outer surface 152 that would correspond to protrusion 608. The folding process may be done in any suitable manner and may be readily performed using automated equipment after the cutting process.

Among other advantages, employing a discrete bottom housing plate, top housing plate and closed-ended housing wall with open top and bottom portions allows for improved camera inspection during the manufacturing process compared to other systems that required the placing of components within a five sided cup. In addition, other welding angles can be employed to attach various components as well as other ease of operation such as attaching the link 144. An acoustic device as disclosed herein can be manufactured using automated equipment in a more cost effective and faster manner as compared to existing manual assembly processes. It will be recognized that any suitable materials may be employed and other variations are contemplated. For example, the bottom plate instead of being steel can be ferromagnetic depending upon the application. In addition, the base plate may have varying thicknesses to avoid, for example, using the yoke plate 124. Differing reed designs and coil designs may also be employed as well as different diaphragm designs if desired.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

The invention claimed is:

1. An acoustic receiver comprising:

a first receiver subassembly comprising:

a bottom housing plate; and a motor disposed on the bottom housing plate, the motor including a coil having a passage, a yoke retaining first and second magnets, and a reed having a portion extending through the passage and between the magnets;

a second receiver subassembly comprising a closed-ended housing sidewall having a first open end and a second open end, the first receiver subassembly and the second receiver subassembly are separate components, the bottom housing plate disposed over and fastened to the first open end of the closed-ended housing sidewall to form at least a portion of a receiver housing, wherein the closed-ended housing sidewall is disposed about the motor;

a diaphragm located in the receiver housing, the diaphragm separating an interior of the receiver housing into a front volume and a back volume, wherein the motor is disposed in the back volume;

a link interconnecting a movable portion of the reed with a movable portion of the diaphragm, wherein the reed is movable between the first and second magnets in response to an excitation signal applied to the coil.

2. The receiver of claim 1, wherein the closed-ended housing sidewall includes an acoustical port through a portion of the sidewall forming the front volume and a lead pass-through opening through a portion of the sidewall forming the back volume.

3. The receiver of claim 2, wherein the closed-ended housing sidewall is a folded sheet material having a first end and a second end coupled at a butt joint, wherein the folded sheet material has multiple sidewall portions.

4. The receiver of claim 3, wherein an inside surface of the closed-ended housing sidewall comprises projections on which the diaphragm is disposed.

5. The receiver of claim 4 wherein the closed-ended housing sidewall is comprised of first, second, third and fourth sidewall portions and wherein the acoustical port is disposed through the first sidewall portion and the lead pass-through opening is disposed through the second sidewall portion opposite the first sidewall portion.

6. The receiver of claim 1 comprising a housing cover plate, fastened to the second open end of the closed-ended housing sidewall.

7. The receiver of claim 1, the yoke fastened to the bottom housing plate with a weld, the coil disposed about a bobbin, and the coil fastened to the bottom housing cover plate with adhesive.

8. The receiver of claim 1 wherein the closed-ended housing sidewall having the first open end and the second open end comprises:

a single strip of metal that includes a first end and a second end coupled by a joint to form a closed-ended receiver housing sidewall;

an acoustical port disposed through a first portion of the closed-ended receiver housing sidewall;

a lead pass-through opening disposed through a second portion of the closed-ended receiver housing sidewall;

a plurality of diaphragm-support projections protruding from an inside surface of the closed-ended receiver housing sidewall, wherein the acoustical port is disposed on one side of the diaphragm-support projections and the lead pass-through opening is disposed on an opposite side of the diaphragm-support projections.

* * * * *